United States Patent [19]
Holm-Hansen et al.

[11] 3,871,767
[45] Mar. 18, 1975

[54] APPARATUS FOR DETERMINING LUMINESCENCE

[75] Inventors: Osmund Holm-Hansen, La Jolla; Charles Rockwell Booth, San Diego, both of Calif.

[73] Assignee: Science Applications, Inc., La Jolla, Calif.

[22] Filed: June 20, 1973

[21] Appl. No.: 371,738

[52] U.S. Cl. .............................. 356/215, 250/361
[51] Int. Cl. .......................................... G01j 1/46
[58] Field of Search ............ 356/215, 39, 226, 180; 250/361, 362, 369; 195/127; 23/230 B

[56] References Cited
UNITED STATES PATENTS
| | | | |
|---|---|---|---|
| 3,541,311 | 11/1970 | Taylor | 250/361 |
| 3,644,045 | 2/1972 | Walsh | 356/85 |
| 3,797,999 | 3/1974 | Witz et al. | 250/361 |

*Primary Examiner*—Vincent P. McGraw
*Assistant Examiner*—Conrad Clark
*Attorney, Agent, or Firm*—Bruno J. Verbeck

[57] ABSTRACT

An improved method and apparatus for determining the amount of luminescence of a test sample which luminesces when contacted with a luminescence-inducing material is described. The apparatus comprises a sample-holding means, a light-detecting means in the form of a photometer tube, a shutter means, all of these having a housing portion which when secured together provide a light-tight environment. The phototube provides a current having a value determined by the light output of the sample. Such current is fed via an I/E amplifier to a voltage frequency converter which provides a pulse train output having a frequency which varies in proportion to the light output of the test sample. Timer means provide an initial delay period followed by a measurable integration period, the pulse output of the voltage to frequency converter being gated for counting during such integration period to provide the integral $$\int_{t1}^{t2} I_v dT.$$

13 Claims, 5 Drawing Figures

3,871,767

APPARATUS FOR DETERMINING LUMINESCENCE

FIELD OF THE INVENTION

This invention relates to improved apparatus for detecting and measuring luminescence in a sample of unknown material, and recording the degree of luminescence, if any, in such sample of unknown material when it is contacted with a luminescence-causing material.

DESCRIPTION OF PRIOR ART

The measurement of light emission associated with bioluminescent and chemiluminescent reactions is important in that it permits the determination of the presence or absence of one or more of the reactants necessary for a luminescent reaction to occur, and also to measure concentration of such reactants.

The techniques for doing this are generally based on the measurement of light intensities which are generally not bright — this being a fairly general characteristic of bioluminescent and many chemiluminescent reactions — and involve the use of a photo-electric cell. Where very low intensity measurements are to be studied, photomultiplier tubes are especially useful.

One of the early instruments for measuring total light emitted from a bioluminescent reaction was comprised of an electrometer, a potentiometer, a condenser, a microscope and a gas-filled photocell.

Another instrument of the prior art is the Farrand Flourometer suitable for measuring luciferases and luciferins.

Macniechol's photomultiplier photometer was still another instrument, which was designed for measuring either light intensity or total emitted light over a wide range of brightness, and utilized a photomultiplier tube whose output could be registered on either a cathode ray oscilloscope, or recorded on paper with suitable recorders.

Another apparatus is a recording light integrator utilizing a vacuum tube electrometer, which together with the foregoing instruments is referred to or described in "Methods of Biochemical Analysis" Volume VIII, copyrighted 1960 by Interscience Publishers, Inc., 250 Fifth Avenue, New York 1, New York, pages 84–94, 104–107 and 111–113.

There is described still another apparatus for measuring bioluminescence, in "Limnology and Oceanography", Volume 11, No. 4, October 1966, pages 510–519. Another instrument is illustrated in NASA TECH BRIEF 71-01155 dated Apr. 1971. And a further one is that described in U.S. Pat. No. 3,359,973, to Duane G. Hoffman, issued Dec. 26, 1967.

While the instruments of the prior art have utility in the measurement of bioluminescent and chemiluminescent reactions, they are not entirely satisfactory either in terms of cost, simplicity, accuracy, sensitivity, speed and versatility for many uses, for example where it is necessary to measure extremely low concentrations of adenosine triphosphate (ATP) for microbial biomass determinations.

SUMMARY OF THE INVENTION

An important object of the present invention is to provide an improved device for measuring the luminescence associated with bioluminescent and chemiluminescent reactions. Further objects of the present invention are:

1. Provide an improved apparatus to more effectively measure the bioluminescence resulting from the reaction of luciferin (reduced), adenosine triphosphate, and oxygen, in the presence of magnesium ions and luciferase.
2. Provide a new and useful apparatus for the quantitative determination of adenosine triphosphate.
3. Provide an improved apparatus to determine microbial biomass in a sample containing the same.
4. Provide an improved apparatus for detecting the presence of living cells in liquids.

The objects and advantages of the present invention, together with the organization and manner of operation thereof, will be best understood by reference to the following description taken in conjunction with the accompanying drawings, wherein.

DESCRIPTION OF SPECIFIC EMBODIMENTS

Figure 1:
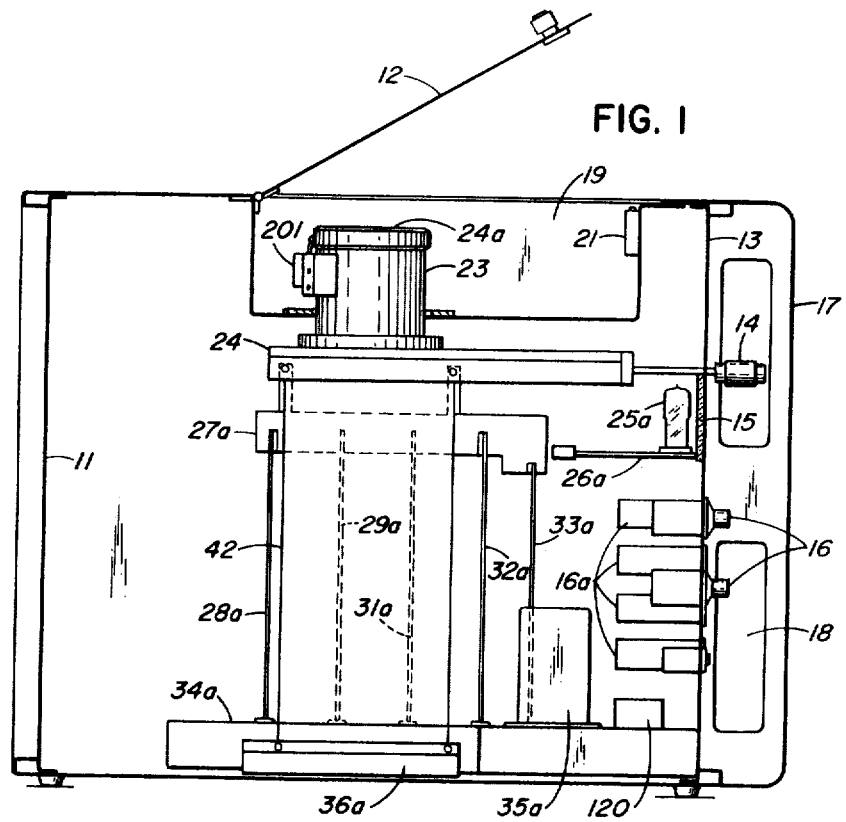
FIG. 1 is a side view of apparatus of the present invention.

As shown in FIG. 1, the apparatus is contained within a housing 11 made of sheet metal, plastic or the like, having a hinged lid 12 and a front panel 13 on which are positioned slide knob 14, a window 15 and potentiometer dials 16 connected to suitable switches 16a. An external side panel 17 is secured to the housing 11 by any suitable means, and is fashioned so as to have integral handles 18 as shown.

Figure 3:
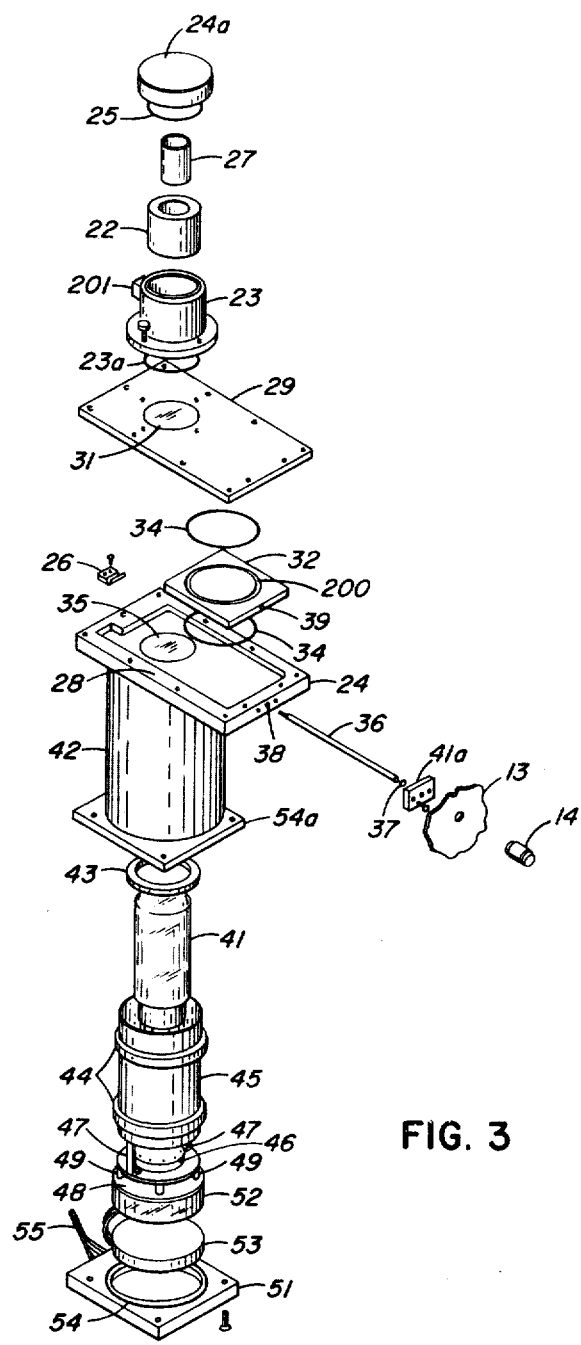
FIG. 3 is an exploded view of the sampling assembly of the apparatus.

Sample holder compartment 19 defines a space which contains within it a magnetic latch 21 for holding the hinged lid 12 in place when it is in a closed position, and a housing 23 around a sample holder 22 having polished interior surfaces (shown in FIG. 3).

Figure 2:
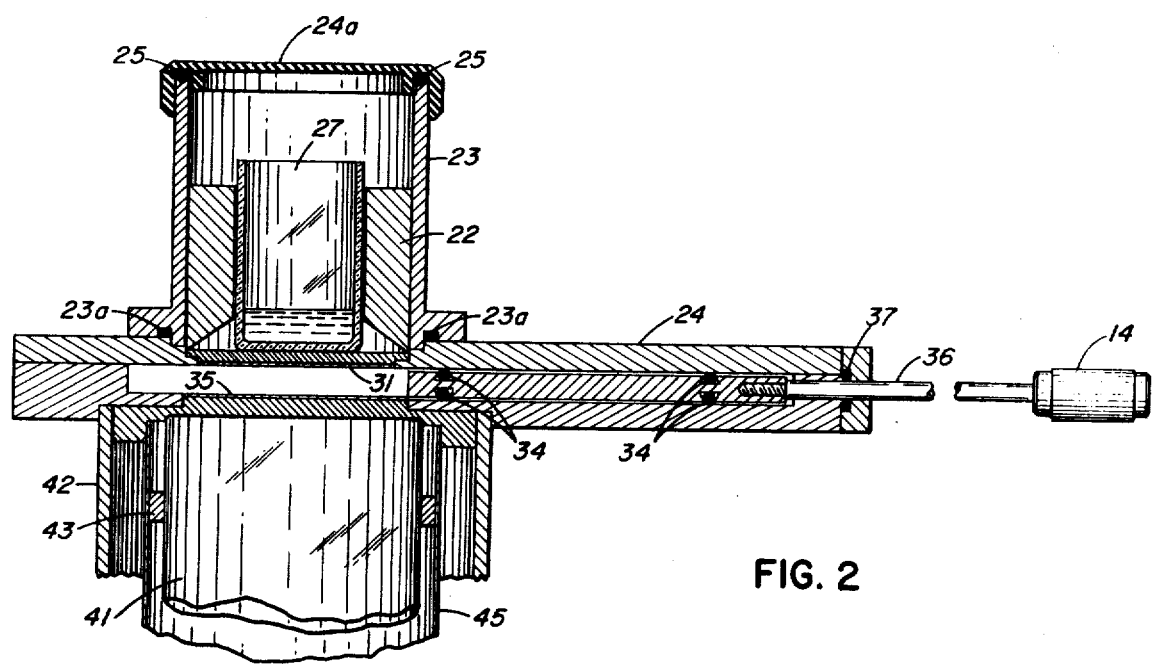
FIG. 2 is a view in cross section of the sampling assembly of the apparatus of the present invention.

As shown in FIG. 2, a sample holder housing 23 is secured by means of bolts or machine screws (not shown) to slide chamber 24 with black silastic-adhesive 23a to provide a light seal.

Sample holder housing 23 is equipped with a cap 24a adapted to fit with a labyrinth seal over the housing 23. An "O" ring 25 (FIG. 2) serves to provide a light seal when the cap 24a is positioned on the housing 23. Photomultiplier tube protection microswitch 26 is suitably secured to the housing 23 as shown.

As shown in FIG. 1 Nixie tubes 25a are positioned on a readout printed circuit board 26a. Printed circuit board brace and retainer assembly 27a is secured to the slide chamber 24 by screws or the like, and serve to hold in place printed circuit boards 28a, 29a, 31a, 32a and 33a.

Electronic chassis 34a supports the printed circuit boards hi-voltage control relay 120 and also transformer 35a. A bottom cover 36a is suitably secured to the photomultiplier tube housing 42.

As shown in FIG. 3, the housing 23 is adapted to receive and hold a sample vial 27 of glass or other material, having a transparent base to permit light to pass through.

Slide chamber 24 to which housing 23 is secured in a light-fast manner, (as best shown in FIG. 3) has its border surfaces 28 coated with black silastic adhesive to effect a light seal between it and slide cover 29 when the latter is in position and secured to slide housing 24. Slide cover 29 is equipped with a window 31 of lucite or other suitable transparent plastic or glass. Photomultiplier tube light protection slide 32 has a groove 200 for receiving slide "O" rings 34 and when the slide 32 is in place within slide housing 24, slide "O" ring light seals 34 are present within groove 200 to effect a light seal. Slide housing 24 also containes a window 35 which, like window 31, is made of lucite or other suitable transparent plastic or glass. A slide rod 36, equipped with an "O" ring light seal 37 is adapted for insertion through opening 38 in slide housing 24 to be threadibly secured at 39 to slide 32.

When slide cover 29 is secured to slide housing 24 with light protection slide 32 within it and secured to slide rod 36, the slide 32 may be moved so as to cover or uncover window 35 by moving slide rod 36 back or forth. "O" ring light seal 37 is so located on slide rod 36 that when the rod 36 is moved inwardly of the housing 24, it makes light seal contact with opening 38 at the point where slide 32 covers window 35 to augment the light seal effect of "O" rings 34 and furnish added light seal protection in the event "O" rings 34 fail. Attached to the other end of slide rod 36, which passes through light seal retainer 41a and front panel 13, is a slide knob 14.

The photomultiplier tube 41 is positioned within housing 42 with the other members of the photomultiplier tube assembly, as shown. These other members include a tube spacer ring 43 and spacer rings 44 of foam rubber. A magnetic shield 45 for the photomultiplier tube 41 is attached to the tube base 46 by means of legs 47 and the base 46 is attached by any suitable means to preamplifier and resistor string board 48 by means of suitably attached legs 49. Between bottom cover 51 and the preamp and resistor string board 48 there is a spacer 52, preferably of lucite, and a foam rubber tube base preload spacer 53 which fits against bottom cover "O" ring light seal 54. The base 54a of housing 42 is secured to bottom cover 51 by screws or bolts as shown, and power and signal cables 55 lead out from bottom cover 51 to a power supply and circuitry as shown in FIG. 4.

Figure 4:
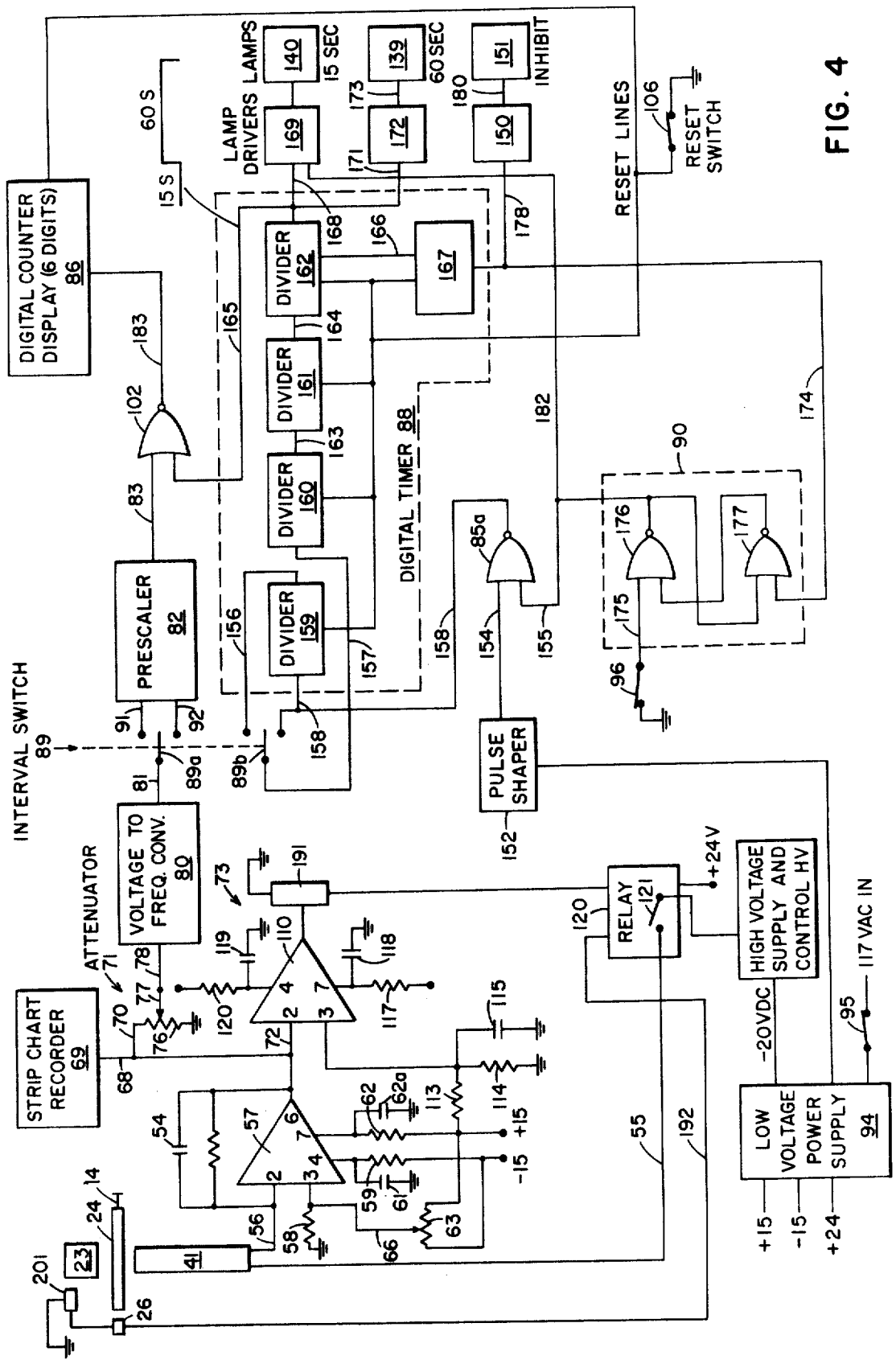
FIG. 4 is a schematic diagram of the circuitry for the photometer of the present invention.

The circuitry for the photometer of the present invention is shown in schematic form in FIG. 4. With reference thereto, the phototube 41 is shown with its photocathode arranged to be exposed to the light in sample chamber 23 whenever slide knob 14 is moved outwardly from slide chamber 24. Phototube 41 may be of a type commercially available from Emitronics, Inc., Gencom Div., 80 Express St., Plainview, L.I., New York, 11803, and capable of providing very high gain in response to extremely low dark currents. The spectral response to the phototube allows the photometer to measure light from 300 to 640$_{m\mu}$ in wavelength. Phototube 41 is capable of detecting 7.2×10-17 watts of incident radiation at 400$_{m\mu}$.

The maximum amount of light capable of being safely measured by phototube 41 is determined by the high voltage control HV which adjusts the value of the high voltage HV supplied over contacts 121 and path 55 to the cathode of tube 41. The signal output which appears on the anode of tube 41 (and is output over signal conductor 56) comprises a current having a value which is determined by the light output of the luminescent reaction in sample chamber 23 which strikes the photo cathode element of the phototube 41.

The photo cathode element is responsive to such light to liberate electrons in known manner which cascade through the photo tube to produce an output amplified current at the anode of the phototube 41 which is proportional to the light intensity of the sample. The resultant current output which is of an extremely low value (frequently in the order of pico amps) is fed over conductor 56 to a first input terminal 2 for current to volts I/E amplifier 57. As schematically shown in FIG. 4, the first input terminal 2 of I/E amplifier 57 is also connected over RC circuit 54 to the output of I/E amplifier 57; terminal 3 is connected to a bias network including resistor 58 and adjustable resistor 63 which are connected between −15 volt and +15 volt; terminal 4 is connected over capacitor 61 to ground and over resistor 59, to the −15 Vdc output of the regulated power supply 94; terminal 7 is connected over resistor 62 to +15 Vdc and over capacitor 62a to ground. With such connections, I/E amplifier 57 has an input defined by $Z_{in} = R_F/E_o$ and an output which is defined by $E_o = -i_{in} \times R_F$.

As will be shown, during a test the signal output of I/E amplifier 57 comprises a dc voltage which varies in value with the light output of the luminescent reaction in sample chamber 23. Such voltage signal is fed over (a) a first path 68 to an associated strip chart recorder 69, (b) over a second path 70 to attenuator 71, and (c) over a third path 72 to an overload detector circuit 73.

As described in more detail hereinafter, overload detector circuit 73 is operative, whenever the output of the I/E preamp 57 exceeds a reference voltage, to effect interruption of the high voltage power HV which is supplied by power supply HV over contacts 121 of a HV relay and conductor 55 to the cathode element of phototube 41. The protection circuit 73 is also connected to be enabled by microswitches 26, 201 which are connected in series to complete an energizing cirucit to relay 120 to thereby open contacts 121 and interrupt the high voltage supply HV to the photomultiplier tube 41a whenever the top of sample chamber 23 is removed and dark slide 14 is withdrawn from slide compartment 24. Such circuit arrangement thus minimizes the chance of permanent damage or instability to phototube 41 from ambient light.

With reference once more to the voltage signal output of the I/E amplifier 57, the voltage signal as applied over path 70 is attenuated by an attenuator 71 which comprises a resistor 76 having an adjustable arm 77 that is movable to different positions to vary the resistance value of resistor 76 and therby the value of the voltage signal output over path 78 to dc voltage to frequency converter 80. Adjustable resistor 76 is linear and, as will be shown, permits the user flexibility in selecting the number of counts which are to be output from the dc voltage to frequency converter 80 for a given voltage output of the I/E amplifier 57.

Voltage frequency converter 80 provides a pulse train output over path 81, which pulses are provided at a frequency that is continually proportional to the value of the dc voltage signal applied to the input thereof. As will be recalled, the voltage signal is in turn proportional to the light reaction of the luminescent material in sample chamber 23 which is detected by the photomultiplier tube 41a.

The pulse train output of voltage to frequency converter 80 is fed over path 81 to the input of prescaler circuit 82, which is operative to provide a pulse output over path 83 to gate 102 in response to receipt of a predetermined number of pulses input over path 81. The prescaler in one embodiment uses two circuits which are operative to provide 1 pulse output for each 10 pulses input thereto over path 81 when contact arm 91 of selector switch 89a is preset to position 6s, and 1 pulse output for each 100 pulses input thereto over path 81 whenever contact arm 92 of selector switch 89a is preset to input 60s.

According to the invention, a digital timer 88 and logic circuitry selectively enable gate 102 to gate the pulse output of the prescaler 82 to counter 86, obtainable from Texas Instruments Company as SN7490 and SN74141, the nixie tubes type B5750 obtainable from Burroughs Corp., for a measured interval of time (an integration period) which starts only after the expiration of a predetermined delay following operation of start switch 96. As will be shown, at the end of the measured interval, the count assimilated in the counter 86 during the integration period represents the integral $$C \int_{t1}^{t2} I_v dT = \text{Displayed Counts}$$

where C is a constant determined by a combination of the high voltage HV applied to phototube 41, the setting of attenuator 71, and the sensitivity and the optical geometry of phototube 41; $I_r$ is the intensity of the light emitter from the sample, and $t_1$ and $t_2$ represents the initial and final periods respectively of the selected integration period.

The count accumulated in digital counter and display 86 is presented as a digital readout on the associated six digit display.

The integration is derived from a 60 Hz signal from power supply 94. In cases where the 60 Hz line voltage frequency is not available or is unstable, a crystal oscillator is supplied to generate the necessary 60 Hz.

The time intervals selected for integration are generated by taking a low voltage sine wave 60 Hz signal from power supply 94 over line 153 and creating a square wave, compatible with the following digital circuitry, by use of a digital pulse shaping network 152 comprised of NAND gates (such as SN7400N available from Texas Instruments) and resistors, capacitors, and diodes arranged in a standard fashion. This 60 Hz signal is sent over line 154 to NAND gate 85a which is gated by RS flip-flop 90 comprised of suitably connected NAND gates 176 and 177. This flip-flop is set by start switch 96 as connected by line 175. When in the "set" mode, R-S flip-flop 90 opens gate 85a over line 155 permitting the 60 Hz signal from pulse shaper 152 to be carried over line 158 to interval switch 89b and divider 159. Divider 159 takes the 60 Hz signal input to it and divides by 10 to output a 6 Hz signal on line 156. Interval switch 89b is arranged so as to select either a 6 Hz signal from divider 159 connected by line 156, or a 60 Hz signal from line 158 and output this signal over line 157 to divider 160. When interval switch 89 is in the 6 second position, lines 158 and 157 will be connected and when in the 60 second position, lines 157 and 156 will be connected. In the following descriptions of the digital times, it will be assumed that switch 89 is in the "60 second" position. (Dividers 159 and 160 are of the type SN7490N available from Texas Instruments.)

Divider 160 is connected so to output a 0.6 Hz signal over line 163 to divider 161. Divider 161 is connected to output a 0.066 Hz pulse such that the pulse undergoes a downward (logical 1 to 0) transition 15 sec. after the first pulse is input to it from divider 160, and maintains a 0.066 Hz frequency after that until stopped and reset. Divider 161 is comprised of circuits such as types SN7490, SN7400 available from Texas Instruments connected in a suitable fashion.

The 0.066 Hz signal (with a period of 15 sec) from divider 161 is output over line 164 to divider 162. Divider 162 is connected so as to produce a pulse over lines 168 and 165 that starts at a logical 0 and after 15 seconds (1.5 seconds if switch 89 is in the "6 sec" position) undergoes a transition to logical 1 which is maintained for 60 (6.0 sec in the "6 sec" position of switch 89) more seconds and then undergoes a second transition back to 0.

Divider 162 is connected by 165 to gate 102 so as to pass pulses from prescaler 82 on to line 183 when a logical 1 is present (as described above). Divider 162 is also connected by 171 to lamp driver 172 and lamp 139 as to cause the lamp to indicate that the 60 sec counting phase is occurring. Lamp driver 169 is connected to RS flip-flop 90 by line 182 and to divider 162 by line 168 so as to cause lamp 140 to indicate the 15 second phase prior to the 60 second counting phase as described above.

Divider 162 is connected to circuit 167 by line 166. Circuit 167 is connected so as to force RS flip-flop 90 into the RESET position after transition to logical 0 by 162 as described above and to hold 90 in the "reset" position, closing gate 85a and preventing start switch 96 from returning 90 to the SET position. RS flip-90 will be inhibited until the RESET switch 106 is closed. This inhibited condition is indicated by "RESET" lamp 151, driven by lamp driver 150.

The reset switch 106 is connected to the readout circuit, 84, dividers 159, 160, 161, 162 and circuit 167, causing, when used, the above circuits to be reset, and clearing the digital readout 86.

A power supply 94 which is connected to a 117v ac, 60-cycle source over on-off switch 95 provides (a) +20 Vdc from which high voltage in the order of −1200 volts dc is derived. Power supply 94 also produces +5v over a second output, −15v over a third output, +15 v over a fourth output, a 60 ~ pulse output over a fifth output, and + 28 Vdc over a sixth output.

Protection circuit 73 will be described in more detail hereinafter.

SYSTEM OPERATION

In use, the power switch 95 is turned on and power supply 94 and the HV supply provides the indicated power outputs to the various components in the system. Selector switch 89 is operated to the 6s or 60s position to select the integration period desired (i.e., 6 seconds or 60 seconds). In addition, reset switch 106 is operated to reset the counter and display unit 86 and digital timer 88. Attenuator 71 is set to zero and after a warm-up period, start switch 96 is operated and a zero starting point using the zero control for the equipment is established. More specifically, after an initial delay period of fifteen seconds (which period is indicated by the illumination of lamp 140) the adjustable arm 66 on resistor 63 is rotated until counts begin to appear on display unit 86. The control arm on resistor 63 is now moved backwards until the point is reached at which no more counts or changes are observed on the display unit 86. The unit is now zeroed and readied for operation.

In one embodiment (not shown) the high voltage input over conductor 55 to the phototube 41 may be adjusted to different values, and in such embodiment it may be necessary to repeat the zeroing process with each change of the high voltage setting.

The attenuator 71 may be adjusted to different positions to select the range of counts which are to be provided on display 86. That is, since the readout of the photometer is in arbitrary units, the readout may be calibrated for direct display of quantities of ATP if so desired, by adjustment of attenuator 71. The ability to so calibrate the readout is particularly useful in process control applications where a quick determination of ATP or a number of criteria is desired.

Digressing briefly, the attenuator control 71 is linear and consequently a count of 5,000 with an attenuator setting of 0.0 would equal a count of 2,500 at a setting of 5.00 or 1,000 at 8.00. Thus the attenuator 71 permits the user to work within a range of counts which is best suited to its purpose.

With the equipment adjusted in such manner, the system is now ready for use in the measurement of the adenosine triphosphate (ATP) in a sample located in sample chamber 23.

REPRESENTATIVE TEST FOR ATP SAMPLE

As noted above, the quantitative determination of ATP by bioluminescence is dependent upon (a) firefly luciferase enzyme being absolutely specific for ATP; (b) the rate of reaction being directly proportional to the concentration of ATP assuming that other reactants are in excess, and (c) the emission of a photon of light for each molecule of ATP which is hydrolyzed.

When a sample containing ATP is injected into the enzyme preparation there is an immediate burst of light in a range of 560 to 580 $m\mu$. The intensity of the light declines in a semi-exponential factor as shown in FIG. 5.

Figure 5:
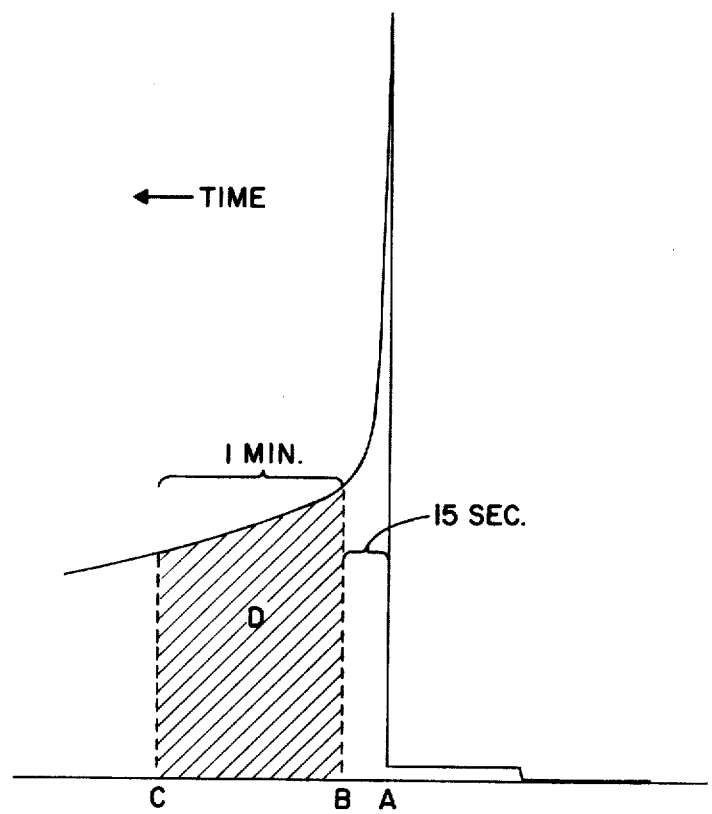
FIG. 5 is a representative recorder trace of light vs. time for an ATP reaction.

The area under theis curve is proportional to the amount of ATP in the sample, and as will be shown the novel circuit in FIG. 4 is effective to provide a digital readout of the integrated light represented by the shaded area in FIG. 5.

The volume of enzyme preparation and sample extent to use per test will vary with the number of tests to be run and the concentration of ATP in the sample. In a typical test, 1.0 ml of enzyme preparation and between 0.1 and 2.0 ml of sample solution are used. After the instrument has been allowed to warm up and the system has been prepared as indicated above, the test samples are prepared and brought to room temperature in a water bath. The enzyme preparation is pipetted into glass vials and swirled gently to distribute the liquid over the bottom of the vial. It is convenient to use two automatic pipettes with disposable polyethylene tips for pipetting the enzyme preparation and the test samples.

The dark slide 14 is then moved to its furthest inward position, the top of sample holder 23 is removed and the vial with the enzyme preparation is inserted into the sample chamber 23. The top is then replaced, and the dark slide 14 is pulled out.

With selector switch 89 in the 6 second position, reset switch 106 is operated once more to clear the digital readout on display unit 86, and to reset the other circuit components as described above, and the start switch 96 is operated to enable the circuit to provide a readout of the CPM (counts per minute) of the enzyme preparation based on a 6-second integrating interval which is automatically corrected to indicate the total number of counts per minute. The results of the test which appear on display unit 86 may be recorded as a measure of enzyme preparation background activity.

The selector switch 89 is then adjusted to the 60-second position (60s) and reset switch 106 is once more operated to reset the equipment. The dark slide 14 is pushed in and the top of the sample holder 23 is opened and the vial is removed. The standard ATP solution or test sample is then injected directly into the enzyme preparation. At the same time, the circuitry is enabled by operating the start switch 96 by means of a foot pedal. The vial is swirled a few times to achieve complete mixing and then inserted into sample chamber 23. The top is quickly replaced and the dark slide 14 is pulled to its outer position. The user has a 15-second period between actuation of the circuitry by operation of switch 96 and the start of the 60-second integration period. At the end of the one-minute integration period, the CPM readout which appears on display 86 is recorded.

The above sequence of operations is repeated with a new vial. As the enzyme preparations will change slowly during a 3 to 4 hour period, it is advisable to run a series of standards before and after the batch of samples. The samples preferably are bracketed by ATP standards which are higher and lower in activity than any of the test samples.

CIRCUIT OPERATION

When a sample is placed in the sample chamber 23 after injection of the ATP therein and the dark slide 14 is pulled out, the light output of the sample strikes the photo cathode of the phototube 41a, liberating electrons which cascade through the photomultiplier tube 41a to produce a current proportional to the light intensity of the sample. The current output of the phototube 41a is applied over conductor 56 to I/E amplifier 57 which converts and amplifies the input signal to produce a voltage which is proportional to the light intensity of the sample $E_o = -i_{in}R$ and which is fed (a) over path 68 to optional strip recorder 69, (b) over path 70 to attenuator 71 and (c) over path 72 to protection circuit 73. The signal as attenuated by attenuator 71 is fed over path 78 to the input of voltage-to-frequency converter 80.

Voltage frequency converter 80 is operative to provide a pulse train which at any given time "$t$" has a frequency which is proportional to the input voltage on path 78.

The frequency variable pulse train output from frequency converter 80 is fed over path 81 to prescaler 82 which attenuates the frequency according to the integration time period selected by switch 89 i.e., divides by 100 (60 sec.) or 10(6 sec.)] and outputs a pulse over conductor 83 to gate 102. The pulse output on conductor 83, as will now be shown, is normally blanked by gate 102 from the input of counter 86.

With the operation of start switch 96, RS flip-flop 90 is set enabling gate 85a to pass the 60 Hz pulse train to divider 159 and allowing switch 89a to select the integration time (with switch 89a selecting the proper scaling factor for the voltage to frequency converter 80, corresponding to the integration time selected) and pass the corresponding pulse train to digital timer 88 as previously described.

When RS flip-flop 90 is set by switch 96, lamp 140 is lit indicating that the delay period (1.5 sec or 15 sec, depending upon the position of switch 89) is in progress. Upon completion of the delay period, lamp 140 goes out and lamp 139 lights, indicating that gate 102 has been opened allowing pulses generated by the voltage to frequency converter to be counted by counter 86. Upon completing the integration interval (6 or 60 seconds) lamp 139 goes out signaling the end of the integration period, gate 102 is closed, RS flip-flop is reset and held in the reset mode closing gate 85a and stopping the flow of pulses to the dividers, and lamp 151 is lit indicating that the numbers displayed by the digital readout are final and also indicating that the timer and readouts must be reset before the timer can be started again. The unit is then reset by closing switch 106 and circuits 86, 159, 160, 161, and 162 and 167 are reset, lamp 151 goes out and the unit is then prepared to start another timing sequence.

The accumulated count of the pulses output by prescaler 82 during the 6-second integration period, will appear as a digital readout on display unit 86. Such count represents in CPM the light integrated by the photometer during the period indicated by the shaded area in FIG. 5.

The manner in which digital timer 88 and flip-flop 90 measure a 60-second integrating period with switch 89 in the 60s position will be apparent from the foregoing description.

PROTECTION CIRCUIT 73

The photometer employs a unique protection circuit 73 which is basically an amplifier 110 having a first input terminal 2 connected to the output of I/E amplifier 57 by line 72. A second input terminal 3 of amplifier 110 is connected to a reference network which includes resistors 113 and 114 connected between the +15 volt output of power supply 94 and ground. Capacitor 115 is connected to the junction of resistors 113, 114 for filtering purposes. A further input terminal 7 is connected over resistor 117 to +15v potential, and a capacitor 118 is connected across resistor 117 to ground for filtering purposes. Resistor 120 and capacitor 119 are connected in a similar manner between terminal 4 to −15v.

Amplifier 110 operates as a comparator circuit where the voltage signal $E_o$ output from E/I amplifier is continually compared with the reference voltage provided by the network including resistors 113 and 114.

At such time as the voltage $E_o$ output from amplifier I/E exceeds the value indicated as safe by the setting determined by resistors 113 and 114, the output current of amplifier 110 will via SCR 191 operate relay 120 phototube which opens its contacts 121 to interrupt the HV source to phototube 41. A reset switch (not shown) permits reestablishment of the HV circuit after the condition which caused the overload is corrected.

Two series connected interlocking switches 26 and 201 are connected to provide further protection for the phototube. As described heretofore first switch 201 is located at the top of the sample chamber 23 and positioned to close whenever the top of sample chamber 23 is removed. The second switch 26 is located at one end of the slide 24 and closes whenever slide 24 is moved outwardly from its innermost position.

Thus if the top of the sample chamber 23 is removed with the dark slide 14 withdrawn, switches 26 and 33 being connected in series, will close to connect power over path 192 to relay 120, which operates, and at its contacts 121 interrupts HV power to phototube 41.

CALCULATIONS

For the most work it is convenient to graph the ATP concentration of the standard solutions ($\mu$g ATP/ml) against the CPM registered on the readout display 86. If the initial and final standard curves differ from each other during the three to five hours of running samples, a mean reference curve is drawn for use in calculating the ATP content in the test samples. In more refined analysis involving computer programs, it is feasible to incorporate the relatively minor corrections based on the small variations in enzyme activity.

The concentration of ATP/ml in a test solution must be multiplied by the total volume of extracting medium (usually 5.0 ml) and divided by the volume of sample originally filtered (in ml or liters). Cellular contents of ATP may then be expressed in any fashion desired depending upon what other variables have been measured (that is $\mu$g ATP per cell, per unit wet or dry weight, per $\mu$g organic carbon, etc.).

What is claimed is:

1. In an apparatus for the detection of the presence of micro-organisms in a test sample by means of a bioluminescent reaction comprising first means for providing a pulse train output having a frequency value which varies in proportion to the light output of a test sample as contacted by a reactant, timer means, start means for initiating operation of said timer means, said timer means being operative to provide a first signal at a predetermined delay period after operation of said start means to initiate an integration period, and a second signal at a later selected time to terminate said integration period, means enabled by said pulse train during the time period defined by said first and second signals to provide an output which represents the integrated value of the light output of said sample, and output means for providing signals representative of such integrated value.

2. An apparatus as set forth in claim 1 in which said timer means includes divider means for counting digital pulses output from a digital source, and in which said first signal comprises the leading edge of a pulse output from said divider means, and said second signal comprises the trailing edge of said pulse.

3. In an apparatus for the detection of micro-organisms in a test sample by means of a bioluminescent reactant comprising phototube means for providing a current output signal having a value proportional to the light output signal having a value proportional to the light output of a test sample as contacted by a reactant, amplifier means for converting said current signal to a pulse train having a frequency proportional to said voltage signal, start means, timer means for measuring an initial delay period in response to operation of said start means and for providing timing signals which define an integration period of a predetermined length, and counter and display means for counting the pulses in said pulse train during said integration period and providing a digital display of the readout of said count.

4. An apparatus as set forth in claim 3, which includes a sample chamber for locating said test sample adjacent the light responsive element of said phototube, said test sample being prepared by mixing of reactants external to said sample chamber, and means permitting said test sample to be inserted into said sample chamber, closing and sealing thereof against ambient light and exposure to the light responsive element of said phototube, said initial delay period being provided for operation of the last said means after said mixing of reactants.

5. An apparatus as set forth in claim 3 which includes means for adjusting the number of pulses provided in said pulse train for a given voltage signal and for simultaneously adjusting the length of said initial delay period.

6. An apparatus as set forth in claim 3 which includes means for adjusting said timer means to provide integrating periods of different lengths.

7. An apparatus as set forth in claim 3 in which said means for converting said voltage signal to a pulse train include means adjustable to different positions to provide a different number of pulses output for a given voltage input.

8. An apparatus as set forth in claim 3 which includes lamp indicator means connected to said timer means to provide a visual signal only during said integration period.

9. An apparatus as set forth in claim 3 which includes lamp indicator means connected to said timer means to provide a visual signal indicating the digital count on said display is the result of said integration.

10. An apparatus as set forth in claim 3 which includes overload protection means for interrupting the power to said phototube means in response to a voltage signal which is greater than a predetermined value.

11. An apparatus as set forth in claiam 3 which includes a sample chamber for locating said test sample adjacent the light responsive element of said phototube, slide means for selectively exposing the light in said sample chamber to said phototube, protective means for providing a signal indicating said sample chamber is open and said slide means is in a position to expose said phototube to said slide chamber, and means responsive to said signal to interrupt the high voltage power to said phototube.

12. An apparatus as set forth in claim 3 which includes means for connecting a strip recorder to record the output of said amplifier means.

13. In an apparatus for detection of micro-organisms in a sample by means of a bioluminescent reactant comprising first means for providing a pulse train which has a frequency proportional to and variable with the light intensity of the sample, start means, timer means enabled by said start means operative to provide an initial period of delay for preparation and insertion of the sample into said first means, said timer means being operative thereafter to provide an integration period T1-T2, counter means, means for selectively gating said pulse train to said counter means during said predetermined integration period, said counter means being operative to provide a count which represents the integral $$C \int_{t1}^{t2} I_v dT$$

where C is a constant determined by the phototube sensitivity and other variables in the system. $I_r$ is the intensity of the light emitted from the sample, and $t1$ and $t2$ represent the initial and final times respectively of the integration period.

* * * * *